US011776400B2

(12) United States Patent
Harmel et al.

(10) Patent No.: US 11,776,400 B2
(45) Date of Patent: Oct. 3, 2023

(54) JUNCTION QUEUEING

(71) Applicant: Zoox, Inc., Foster City, CA (US)

(72) Inventors: Moritz Harmel, San Francisco, CA (US); William Anthony Silva, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/525,660

(22) Filed: Nov. 12, 2021

(65) Prior Publication Data

US 2022/0172620 A1 Jun. 2, 2022

Related U.S. Application Data

(63) Continuation of application No. 16/440,793, filed on Jun. 13, 2019, now Pat. No. 11,176,821.

(51) Int. Cl.
*G08G 1/123* (2006.01)
*G05D 1/00* (2006.01)
*G05D 1/02* (2020.01)

(52) U.S. Cl.
CPC .......... *G08G 1/123* (2013.01); *G05D 1/0055* (2013.01); *G05D 1/0088* (2013.01); *G05D 1/0212* (2013.01); *G05D 1/0287* (2013.01)

(58) Field of Classification Search
CPC .... G08G 1/123; G05D 1/0055; G05D 1/0088; G05D 1/0212; G05D 1/0287
See application file for complete search history.

(56) References Cited

U.S. PATENT DOCUMENTS

| 8,160,811 | B2 | 4/2012 | Prokhorov | |
|---|---|---|---|---|
| 8,676,500 | B1 | 3/2014 | Walsh | |
| 9,218,739 | B2 * | 12/2015 | Trombley | G08G 1/09626 |
| 9,459,623 | B1 * | 10/2016 | Raghu | G01S 13/931 |
| 9,818,299 | B1 * | 11/2017 | Jammoussi | G08G 1/161 |
| 9,865,162 | B2 * | 1/2018 | Kurotobi | G08G 1/09623 |
| 10,176,712 | B1 * | 1/2019 | Martins | G08G 1/07 |
| 10,684,626 | B1 | 6/2020 | Martin | |
| 11,498,584 | B2 * | 11/2022 | Oyama | B60W 60/001 |

(Continued)

OTHER PUBLICATIONS

Office Action for U.S. Appl. No. 16/440,793, dated Mar. 30, 2021, Harmel, "Junction Queueing", 6 pages.

(Continued)

*Primary Examiner* — Tan Q Nguyen
(74) *Attorney, Agent, or Firm* — Lee & Hayes, P.C.

(57) ABSTRACT

Junction queueing for vehicles is described, in which vehicles may be queued based on arrival time at a junction, position relative to a stopping location at the junction, and/or an amount of time waiting for other vehicles to proceed through the junction (timeout). In some examples, the queue may be first generated based on the arrival times of any other vehicle relative to a particular vehicle generating the queue. The queue may be updated based on arrival times of other vehicles (e.g., after the particular vehicle), whether another vehicle has proceeded out-of-turn (e.g., based on a position at the junction), and/or a timeout for vehicles that wait for others to yield at the junction. In some examples, hysteresis and alterations of the score for safety reasons may alter queue order. The queue may be used to control the particular vehicle to traverse the junction.

20 Claims, 6 Drawing Sheets

(56) References Cited

U.S. PATENT DOCUMENTS

| | | | | |
|---|---|---|---|---|
| 2013/0304364 A1* | 11/2013 | Miller | ............... | G08G 1/163 |
| | | | | 701/117 |
| 2016/0358479 A1 | 12/2016 | Riedelsheimer et al. | | |
| 2017/0025005 A1 | 1/2017 | Barth et al. | | |
| 2017/0103650 A1 | 4/2017 | Amadon | | |
| 2017/0301233 A1 | 10/2017 | Witt et al. | | |
| 2019/0164419 A1 | 5/2019 | Kumar | | |
| 2020/0001779 A1* | 1/2020 | Alexander | ........... | G06V 20/584 |
| 2020/0377101 A1* | 12/2020 | Parasuram | ............. | G06V 20/56 |
| 2020/0394911 A1 | 12/2020 | Harmel et al. | | |

OTHER PUBLICATIONS

The PCT Search Report and Written Opinion dated Aug. 13, 2020 for PCT Application No. PCT/US2020/037493, 9 pages.
The International Report on Preliminary Patentability for PCT Application No. PCT/US20/37493, dated Dec. 23, 2021, 7 pages.

\* cited by examiner

JUNCTION QUEUEING

RELATED APPLICATIONS

This application claims priority to and is a continuation of U.S. patent application Ser. No. 16/440,793, filed on Jun. 13, 2019, which will issue as U.S. Pat. No. 11,176,821 on Nov. 16, 2021, the entire contents of which are incorporated herein by reference.

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects. A variety of sensors may be used to collect information about objects in the surrounding environment, which may be used by the autonomous vehicle to make decisions on how to traverse the environment. Determining how to proceed at junctions in the environment may, at times, present challenges for controlling an autonomous vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
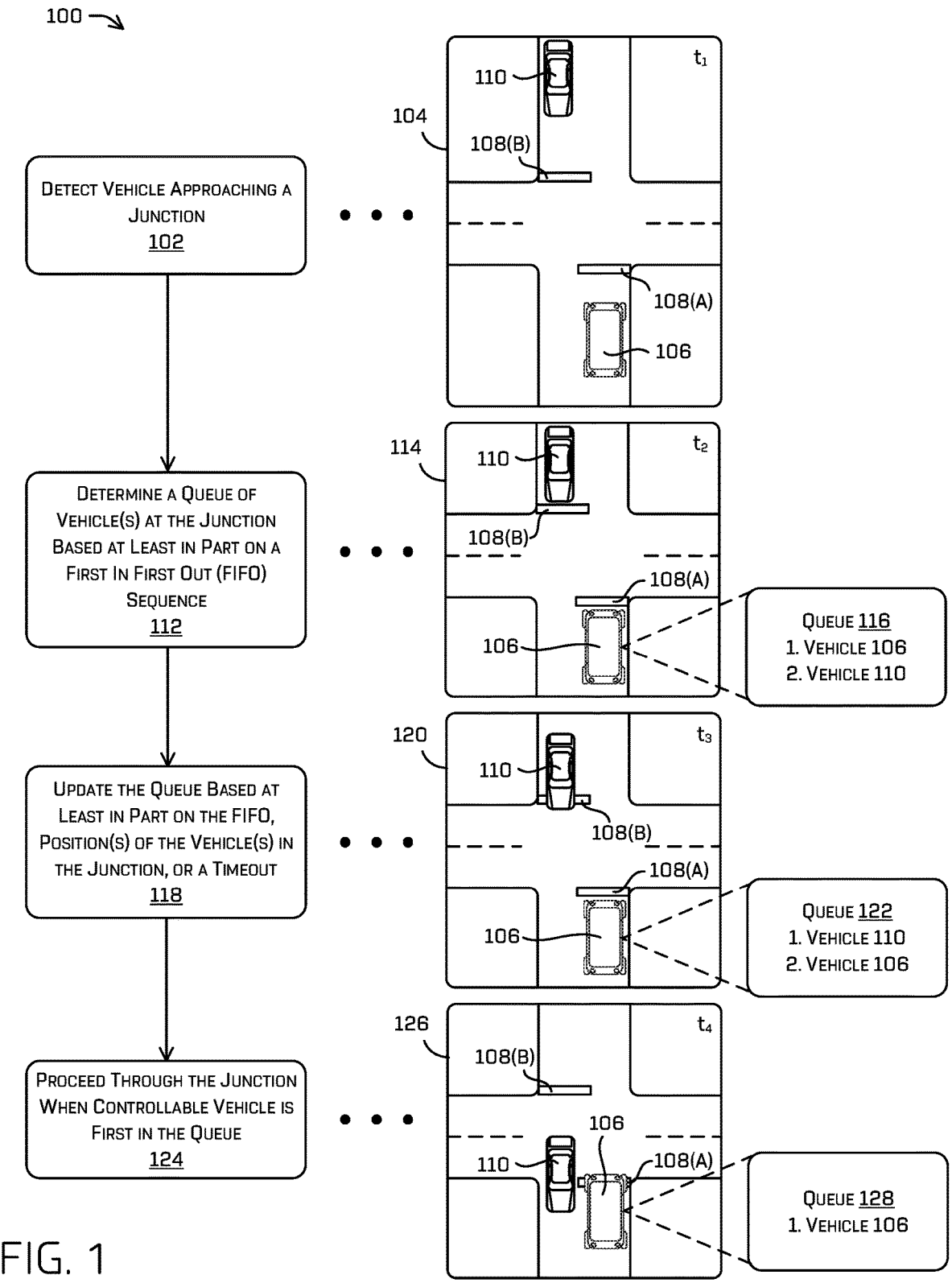
FIG. 1 is a pictorial flow diagram of determining a queue of vehicles at a junction and updating the queue based at least in part on first-in-first-out (FIFO) techniques, positions of vehicles in the junction, and/or a timeout, in accordance with examples of the disclosure.

This disclosure relates to controlling a vehicle (e.g., an autonomous vehicle) at a junction by creating a queue of vehicles at the junction and updating the queue until the vehicle has proceeded through the junction. While the description provided herein generally refers to vehicles, it should be understood that the described techniques may also be used to generate a queue that includes bicycles, scooters, motorcycles, pedestrians, and so forth, and/or any combination of entities present at a junction. In some examples, a vehicle may use a variety of sensor modalities and algorithms to determine that the vehicle is approaching or is located at a junction, and to sense other vehicles at or near the junction. The vehicle may create a queue that includes the vehicle itself, along with any of the other vehicles at or near the junction, and use the queue as part of a determination as to when to proceed through the junction. The queue may be generated based on a score assigned to the vehicle and scores assigned to the other vehicles at or near the junction, where the vehicle may be controlled to proceed if the vehicle has the highest (or lowest) score of all vehicles at the junction. The scores may be based on a variety of components, such as an order that the vehicles arrived at the junction, positions of the vehicles at or in the junction, a wait time of the vehicles at the junction, and so forth.

Junctions, which may include intersections of roadways, are commonplace, and thus appropriately controlling an autonomous vehicle at a junction is necessary to ensure safety of passengers and/or cargo within the autonomous vehicle, along with safety of objects and passengers in the environment. Accordingly, an autonomous vehicle accounts for laws, standards, and behavior of other vehicles when approaching and traversing a junction. In some conventional systems, an autonomous vehicle is controlled to allow all vehicles that arrived prior to the autonomous vehicle to proceed through the junction, then begins to proceed through the junction. However, this type of conventional system does not account for vehicles that arrive after the autonomous vehicle and proceed out of turn, or for vehicles that arrive before the autonomous vehicle but wait for the autonomous vehicle to proceed first, for instance. Therefore, in some examples, the described techniques for junction queueing may generate, and continuously update, a queue that accounts for arrival time, position in or near the junction (in addition to any other state information—including, but not limited to, distance to the junction, speed, etc.), and/or a wait time of the autonomous vehicle to follow traffic laws and standards while being flexible to react to the behavior of other vehicles at or near the junction.

Sensor data captured by the autonomous vehicle can include lidar data, radar data, image data (including depth images, infrared, ultraviolet, and any other wavelength), time of flight (TOF) data, sonar data, and the like. In some cases, the sensor data can be provided to a perception system configured to determine a type of an object (e.g., vehicle, pedestrian, bicycle, motorcycle, animal, parked car, tree, building, and the like) in the environment.

For instance, the sensor data may be captured by the autonomous vehicle as the autonomous vehicle traverses an environment. In some examples, the autonomous vehicle may include one or more cameras configured to capture images (e.g., individual images and/or video) of the surrounding environment. In some cases, images captured by the camera(s) of the autonomous vehicle may be used to detect a junction that the autonomous vehicle is approaching in the environment, although other techniques may alternatively or additionally be used as well (e.g., GPS, map data, or other localization techniques including, but not limited to, lidar localization, and the like). Additionally, images captured by the camera(s) may be used to detect one or more additional vehicles located at, or approaching, the junction. Once again, other techniques may be used to detect additional vehicles at or near the junction, such as analyzing lidar data, radar data, TOF data, and the like.

A queueing component of the autonomous vehicle may create a queue that includes the autonomous vehicle, along with any of the other vehicles located at or near the junction. The queue may be ordered based on scores assigned to the vehicles located at or near the junction. In some examples, the order of the vehicles in the queue may be based, at least in part, on an arrival time of the vehicles at the junction, such as relative to the autonomous vehicle. For instance, the vehicles may each be assigned a component of the score corresponding to a first-in-first-out (FIFO) position at the junction. The queueing component may assign a higher (or lower) value to a component of the score for a vehicle that arrives first at the junction than a vehicle that arrives last at the junction, with corresponding values for vehicles in between the first vehicle and the last vehicle to arrive at the junction.

The order of the vehicles in the queue may additionally be based at least in part on a position of the vehicles at the junction. In some examples, the queueing component may determine positions of any of the other vehicles at the junction relative to a stop line of the junction associated with the other vehicle(s). For instance, a position of a vehicle relative to a stop line of a junction may be used by the queueing component (e.g., to augment, or otherwise determine, the score) to interpret an intent of a vehicle to proceed through the junction. For example, a vehicle that has partially crossed over an associated stop line may be more likely to proceed through the junction than a vehicle that is some distance behind the stop line. Vehicles may each be assigned a component of the score corresponding to the position of the vehicles at the junction, relative to a stop line or other landmark. The queueing component may assign a higher (or lower) value to a component of the score for a vehicle that is positioned farthest across a stop line than a vehicle that is positioned farthest behind a stop line, with corresponding values for vehicles in between the vehicle farthest across the corresponding stop line and the vehicle farthest behind the stop line.

Further, the order of the vehicles in the queue may be based at least in part on a timeout for the vehicles at the junction. In some examples, the queueing component may begin a timer for any of the vehicles that have arrived at the junction and have stopped. If another vehicle exceeds an amount of time being stopped at the junction without changing its position such that a component of the other vehicle's score places the other vehicle behind the vehicle in the queue, the queueing component may signal for the autonomous vehicle to proceed through the junction, or otherwise alter a score associated with the queue. In some cases, the queuing component may assign a higher (or lower) component of the score for a vehicle that has been stopped at the junction for the longest amount of time than a vehicle that has most recently arrived at the junction, with corresponding values for vehicles in between the vehicle that has been at the junction longest and the vehicle that has most recently arrived.

In examples, the queueing component may continuously evaluate any of the other vehicles at the junction, update score(s) based on changes to components of the scores for the vehicle(s), and control the autonomous vehicle accordingly. Additionally, the queueing component may continue to evaluate the other vehicle(s) and the respective scores even as the autonomous vehicle proceeds through the junction, such that if another vehicle also begins to proceed, the autonomous vehicle may yield or continue through the junction based on the circumstances. As the autonomous vehicle proceeds farther and farther through the junction, for instance, the autonomous vehicle may become more assertive, and actions taken by other vehicles (e.g., beginning to cross an associated stop line) may be less likely to cause the autonomous vehicle to yield.

The techniques discussed herein can improve functioning of a computing device in a number of ways. For instance, the queueing component may use data already collected by sensors an autonomous vehicle (e.g., image data, lidar data, time of flight data, map data, etc.) to generate and update a queue of vehicles at a junction. A queue created and updated by the queueing component may be used to narrow a number of potential trajectories for other vehicles at the junction, for instance, while using the data already being collected by the autonomous vehicle. Consequently, significantly less processing resources may be used in comparison to conventional techniques that continue to evaluate numerous trajectory possibilities of vehicles located at a junction. Further, conventional techniques that control autonomous vehicles at a junction are often terminated once the autonomous vehicle begins to proceed, and thus would need to be reinitiated and/or taken over by other vehicle systems should another vehicle enter the junction just after the autonomous vehicle. The techniques described herein, however, continue to update the queue after the vehicle has begun to traverse the junction, which may result in determining an estimated trajectory of another vehicle at the junction more quickly and accurately, and/or for more vehicles at the junction than would be possible if the system was terminated as the vehicle began to proceed through the junction. Further, the techniques described herein may be used to determine a target speed to proceed through the junction more quickly and accurately than conventional techniques by updating the queue as the vehicle begins to proceed through the junction.

In some cases, the described techniques are more accurate than other mechanisms for controlling an autonomous vehicle at a junction. For example, as noted above, techniques that rely solely upon arrival time of other vehicles may not accurately reflect what the vehicles at a junction will do next, such as in the case of vehicles that proceed out-of-turn, or vehicles that wait for all other vehicles at the junction to proceed before entering the junction. By controlling the vehicle based in part on FIFO, positions of the vehicles at the junction, and/or a timeout, the safety of the vehicle can be improved by reacting to the behavior of other vehicles, thus allowing the autonomous vehicle to make its own trajectory decisions earlier and more accurately. Additionally, as just described, controlling the vehicle based in part on FIFO, positions of the vehicles at the junction, and/or a timeout can reduce processing resources, by narrowing a number of trajectory prediction calculations for other vehicles at the junction. Further, techniques for controlling the vehicle based in part on FIFO, positions of the vehicles at the junction, and/or a timeout can increase a confidence that the vehicle can avoid collisions with oncoming traffic by allowing aggressive vehicles to proceed out-of-turn when identified, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication to a driver of the vehicle of whether it is safe to perform various maneuvers. In another example, the techniques can be utilized in an aviation or nautical context, or in any system involving objects or entity that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 is a pictorial flow diagram 100 of determining a queue of vehicles at a junction and updating the queue based at least in part on first-in-first-out (FIFO) techniques, positions of vehicles in the junction, and/or a timeout, in accordance with examples of the disclosure.

An operation 102 includes detecting a vehicle approaching a junction. For instance, an example environment 104 at a time $t_1$ comprises a vehicle 106 which may include one or more sensors, such as a camera sensor, a lidar sensor, a radar sensor, a TOF sensor, or the like, which may be used to generate sensing data of the environment surrounding the vehicle 106. In some examples, the vehicle 106 may first detect that the vehicle 106 is approaching a junction (e.g., based upon a combination of sensing data and map data of the example environment 104), which in the example environment 104 includes stop lines 108(A) and 108(B). Detecting such a vehicle may comprise, for example, determining a position of the vehicle 110 with respect to the stop line 108(B). As the vehicle 106 approaches the stop line 108(A) of the junction, the vehicle 106 may determine that another vehicle 110 is approaching the stop line 108(B) of the junction as well. The vehicle 106 may determine that the vehicle 110 is likely to stop at the junction based on map data and/or sensing data of the vehicle 110 approaching the stop line 108(B) at the junction (e.g., determining one or more of a position, velocity, acceleration, and the like). While the example environment 104 depicts the vehicle 106 and the vehicle 110 at different distances from the respective stop lines 108(A) and 108(B), the vehicle 106 may detect other vehicles arriving at the junction after stopping at the stop line 108(A), which may impact how the vehicle 106 proceeds through the junction.

An operation 112 includes determining a queue of vehicle(s) at the junction based at least in part on a first-in-first-out (FIFO) sequence. An example environment 114 depicts the vehicle 106 and the vehicle 110 stopped at the stop lines 108(A) and 108(B) respectively, having arrived at a time $t_2$ after the time $t_1$. The vehicle 106 arrived before the vehicle 110 in this example, as indicated by the vehicle 106 being closer to the stop line 108(A) at time $t_1$ than the distance of the vehicle 110 from the stop line 108(B) at time $t_1$ (of course, in other examples, such distances need not be indicative of the order in which vehicles stopped—e.g., in an instance where one vehicle stops far behind a stop line). The vehicle 106 generates a queue 116 based on the order of the vehicles 106 and 110 arriving at the junction, such that the first vehicle to arrive at the junction is the first vehicle in the queue, the second vehicle to arrive at the junction is the second vehicle in the queue, and so forth for any of the additional vehicles at the junction. Because the vehicle 106 arrived first at the junction, the vehicle 106 is first in the queue 116, and because the vehicle 110 arrived second at the junction, the vehicle 110 is second in the queue 116.

An operation 118 includes updating the queue based at least in part on the FIFO, position(s) of the vehicle(s) in the junction, or a timeout. In some examples, scores are generated for vehicle(s) at the junction based on arrival times relative to the vehicle 106, positions of the vehicle(s) at the junction, and/or a timeout. The scores (and components of the scores) may be determined substantially simultaneously, e.g., in parallel. The scores of the other vehicle(s) are then compared to a score for the vehicle 106, and the vehicle(s) (including the vehicle 106) are ranked based on the scores to generate and/or update the queue. In an example environment 120 at a time $t_3$ after the time $t_2$, for instance, the vehicle 110 has begun to proceed through the junction out-of-turn. In other words, because the vehicle 106 arrived before the vehicle 110, the vehicle 106 should also proceed through the junction before the vehicle 110 based on FIFO. However, the vehicle 106 may detect a position of the vehicle 110 changing from behind the stop line 108(B) into the center of the junction, and thus may update the queue 116 to a queue 122 in which the order of the vehicles has changed to reflect the position of the vehicle 110.

Although not pictured in this example, the queue may also be updated based on a timeout, in which a previous vehicle order in the queue may change responding to another vehicle waiting a threshold amount of time (e.g., 3 seconds, 5 seconds, 8 seconds, etc.) during its turn without proceeding into the junction. If the timeout has expired, the queue may be updated to move the vehicle 106 ahead of the waiting vehicle, which may then cause the vehicle 106 to be controlled to proceed next through the junction. In other examples, the timeout may vary as a component of the score for a vehicle at the junction, rather than being a set number. Additional details regarding calculation of a timeout and execution following a timeout can be found in the discussion of FIGS. 2 and 3B. The queue 122 may continue to be updated as the vehicle 110 proceeds through the junction, and if additional vehicles are present or arrive before the vehicle 106 has proceeded through the junction, these additional vehicles may be added to the queue as well.

An operation 124 includes proceeding through the junction when a controllable vehicle is first in the queue. For example, an example environment 126 at time $t_4$ after time $t_3$ depicts the vehicle 110 as exiting the junction, and the vehicle 106 beginning to proceed through the junction. The vehicle 106 may detect that the vehicle 110 is exiting the junction, and update the queue 122 to a queue 128 that removes the vehicle 110 from the queue, leaving only the vehicle 106 in the queue. Although only two vehicles are described at the junction in this example, other examples are considered with three or more vehicles (see, for instance, FIGS. 3A and 3B). In cases with more than two vehicles, the vehicle 106 may proceed through the junction before other vehicles in the queue, and based on the vehicle 106 being the first vehicle in the queue. As noted above and below, the position of the vehicle 106 in the queue may be based on arrival time at the junction (FIFO), positions of the vehicles at the junction, and a timeout (if applicable). In some examples, scores may be calculated for any of the vehicles at the junction that may be based on one or more of these components, as described in relation to FIG. 2. Scores assigned to vehicles at the junction may then be used to order vehicles in the queue, e.g., from highest to lowest or lowest to highest. Thus, when the vehicle 106 has the highest (or lowest) score, the vehicle 106 may begin to proceed through the junction.

Figure 2:
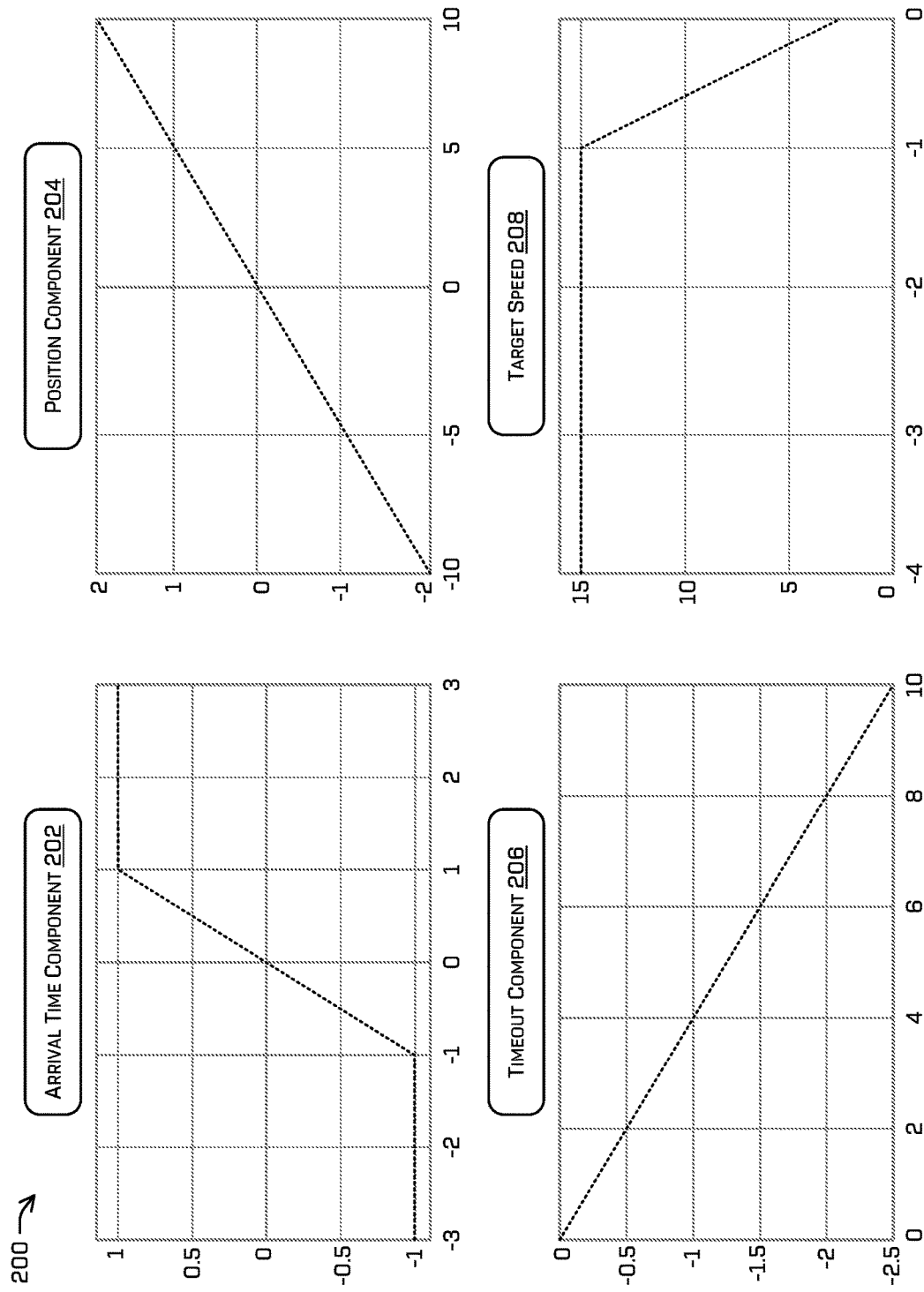
FIG. 2 is an illustration of example graphs which may be used to determine individual components of a score for a vehicle at a junction, and an example graph for determining a target speed of a vehicle to proceed through the junction, in accordance with examples of the disclosure.

FIG. 2 is an illustration 200 of example graphs which may be used to determine individual components of a score for a vehicle at a junction, in accordance with examples of the disclosure.

A first graph 202 illustrates how arrival time at a junction may be used to calculate a component of a score for a vehicle at the junction. For example, the x-axis of the first graph 202 may correspond to arrival time (e.g., in seconds) relative to an autonomous vehicle creating the queue, where 0 represents the arrival time of the autonomous vehicle. The y-axis of the first graph 202 may correspond to a value assigned as a component of a score for another vehicle based on the arrival time of the other vehicle relative to the autonomous vehicle. In this example, another vehicle arriving 1 second or more after the autonomous vehicle would be assigned −1 for the arrival time component of the other vehicle's score, would be assigned −0.5 for arriving 0.5 seconds after the autonomous vehicle, would be assigned 0 for arriving at the same time as the autonomous vehicle, would be assigned 0.5 for arriving 0.5 seconds before the autonomous vehicle, and would be assigned 1 for arriving 1 second or more before the autonomous vehicle. The function for generating a component of a score based on arrival time depicted in the first graph 202 is intended only as an example, and any function may be used to generate a component for a vehicle score based on arrival time (e.g., quadratic, polynomial, exponential, logarithmic, sinusoidal, piecewise, etc.). In this example, a positive arrival time component of the score for the other vehicle corresponds to a higher priority to proceed ahead of the autonomous vehicle through the junction, while a negative arrival time component of the score corresponds to a lower priority to allow the autonomous vehicle to proceed through the junction before the other vehicle (e.g., based on the score for the autonomous vehicle being 0). Of course, any system may be used to evaluate priority for vehicles, such as applying higher priority to vehicles having a negative arrival time component of the score and a lower priority to vehicles having a positive arrival time component of the score.

A second graph 204 illustrates how a position of a vehicle may be used to calculate a component of a score for the vehicle at the junction. For instance, in some examples, the x-axis of the second graph 204 may correspond to a distance (e.g., in meters, feet, etc.) from a stopping location (e.g., from a stop line, crosswalk, sidewalk, etc.) of the vehicle, where 0 represents the stopping location. Alternatively or additionally, the x-axis of the second graph 204 may correspond to a relative distance of the other vehicle from a stopping location compared to a distance of the autonomous vehicle from the autonomous vehicle's stopping location at the junction, such that 0 represents that the other vehicle and the autonomous vehicle are a same distance from the respective stopping positions at the junction. They-axis of the second graph 204 may correspond to a value assigned as a component of a score for the vehicle based on the position of the vehicle relative to the stopping location. In this example, when the vehicle is 10 meters behind the stopping location, the vehicle would be assigned −2 for the position component, with a linear function may be used to determine the value of the component between the value of −2 at 10 meters behind the stopping location to a value of 0 at the stopping location and a value of 2 at 10 meters into the junction beyond the stopping location. The function for generating a component of a score based on vehicle position at a junction depicted in the second graph 204 is intended only as an example, and any function may be used to generate a component for a vehicle score based on position at a junction (e.g., quadratic, polynomial, exponential, logarithmic, sinusoidal, piecewise, etc.). Thus, in this example, a positive position component of the score for the other vehicle corresponds to the other vehicle being further into the junction (e.g., relative to the autonomous vehicle), while a negative position component of the score for the other vehicle corresponds to the autonomous vehicle being further into the junction than the other vehicle.

A third graph 206 illustrates how a timeout may be used to calculate a component of a score for the vehicle at the junction. For example, the x-axis of the third graph 206 may correspond to a timeout time (e.g., in seconds) relative to a start time of the vehicle's turn to proceed through the junction. In other words, the timeout is based on a timer beginning when the vehicle is first in the queue to proceed through the junction (e.g., at 0). The y-axis of the third graph 206 may correspond to a value assigned as a component of a score for the vehicle based on a duration of the timeout. In this example, the timer may be initiated at 0, when the vehicle becomes first in the queue to proceed through the junction. A linear function from the value of 0 when the timer is initiated may be used to determine the value of the component to a value of −2.5 when the timer has reached a time of 10 seconds. The function for generating a component of a score based on a timeout depicted in the third graph 206 is intended only as an example, and any function may be used to generate a component for a vehicle score based on a timeout (e.g., quadratic, exponential, logarithmic, sinusoidal, piecewise, etc.). Such a timeout function, in some examples, may be tailored to remove the majority of those situations in which another vehicle (e.g., vehicle 110) is waiting for the vehicle 106 to proceed, despite having priority to proceed through the junction. For instance, in this example, as time passes the timeout component of the score for the other vehicle continues to decrease (e.g., become more negative). Thus, in this example, at some point the negative value of the timeout component for the other vehicle will cause the other vehicle's overall score to become negative (e.g., when combined with the arrival time component and the position component), and move the autonomous vehicle ahead of the other vehicle in the queue.

The first graph 202, the second graph 204, and the third graph 206 may be used to calculate, by a vehicle such as an autonomous vehicle, components of a score for another vehicle located at a junction with the vehicle. For instance, the score for the other vehicle may be calculated by the following equation:

$$\text{Vehicle score} = \text{Arrival Time} + \text{Position} + \text{Timeout}$$

In various examples, such scores may comprise the weighted average of the three graphs, or otherwise combine the values in any linear or non-linear form. In examples, the vehicle calculating the score may have a default and/or constant score, against which scores of other vehicles at a junction are compared for placement within a queue. In some cases, the vehicle calculating the score may have a default score of 0, where other vehicles having scores higher than the vehicle (e.g., greater than 0) are ahead of the vehicle in the queue, and vehicles having scores lower than the vehicle (e.g., less than 0) are behind the vehicle in the queue. The vehicle may yield to other vehicles ahead of the vehicle having a higher score, and begin to proceed through the junction before other vehicles having a lower score (e.g., when the vehicle is first in the queue). Of course, such scores may be inverted such that, in those examples, the vehicle may yield to other vehicles having a lower score.

In some examples, a target speed of a vehicle to proceed through the junction may be based at least in part on score(s) of other vehicle(s) at the junction. For instance, consider a fourth graph 208, which illustrates how the vehicle's target speed to proceed through the junction may change based on a highest score of any of the other vehicles at the junction. For instance, if a vehicle has begun to proceed through the junction and another vehicle is detected to have begun moving as well, the vehicle may make a determination on whether to yield to the other vehicle based on how far the vehicle is through the junction (e.g., by comparing the vehicle's position relative to an associated stopping position to the other vehicle's position to the other vehicle's associated stopping position) and/or a speed at which the vehicle has attained. In some cases, safer outcomes are provided when the vehicle continues to proceed than when a vehicle stops. In this example, the x-axis of the fourth graph 208 may correspond to a highest score of any of the other vehicles at the junction, which may be dependent upon a position of the vehicle in the junction relative to an associated stopping position. The highest score for any of the other vehicles at the junction may be used to determine a target speed for the vehicle, as represented by the y-axis of the fourth graph 208. Therefore, a more negative score in this example (e.g., farther into the junction relative to any of the other vehicles at the junction) corresponds to a more assertive behavior by the vehicle, and thus scores of other vehicles must reach a higher threshold for the vehicle to yield. Further, a more assertive behavior (e.g., caused by the highest score for any of the other vehicles being a more negative value, in this example) results in a faster target speed for the vehicle, allowing the vehicle to traverse the junction more quickly. Of course, as discussed above, such scores may be inverted such that the vehicle may yield to other vehicles having a lower score value than the vehicle with the default score.

Figure 3A:
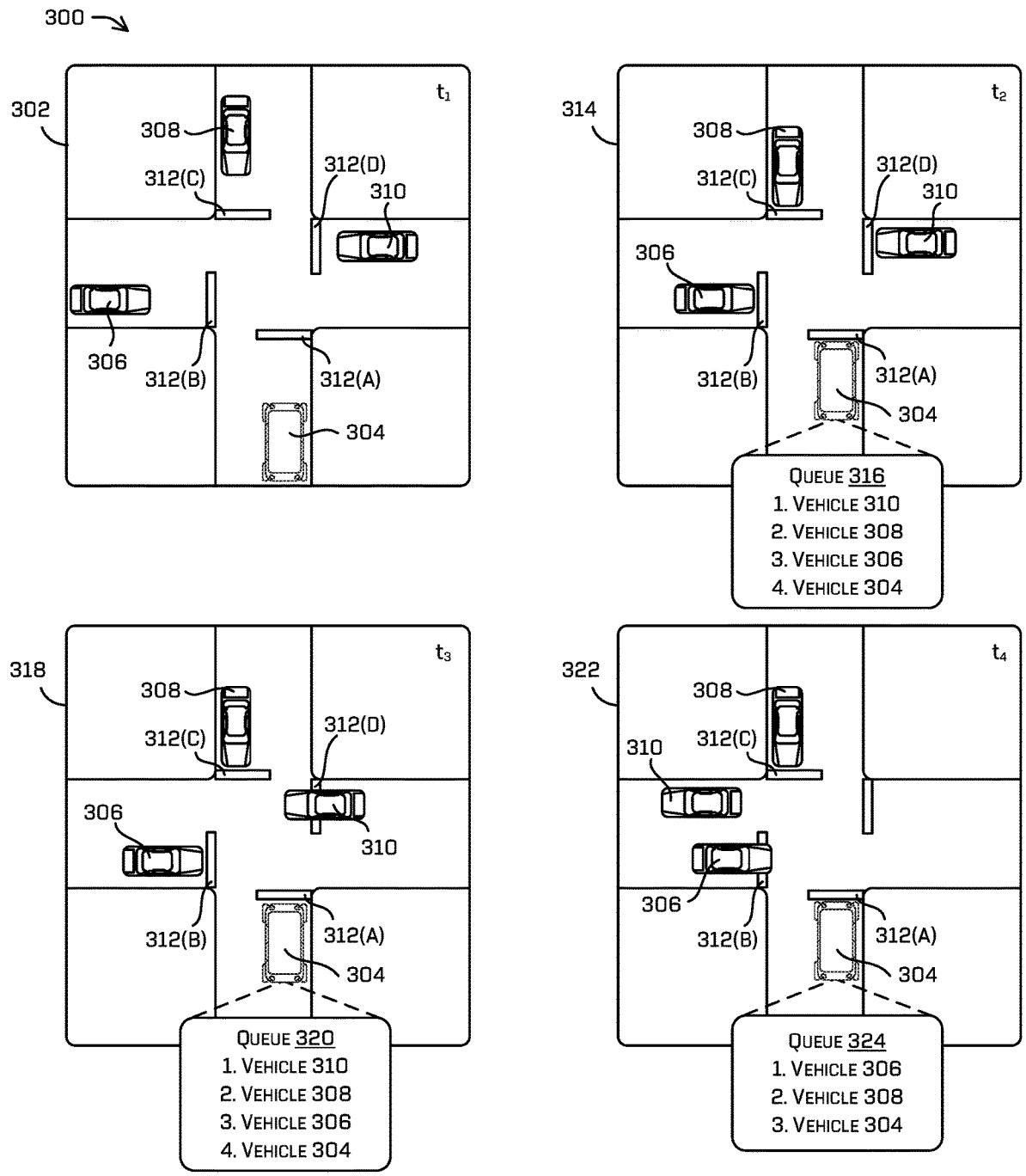
FIGS. 3A and 3B are an illustration of controlling a vehicle at a junction based at least in part on FIFO, a position of another vehicle at the junction, and/or a timeout occurring with another vehicle, in accordance with examples of the disclosure.
Figure 3B:
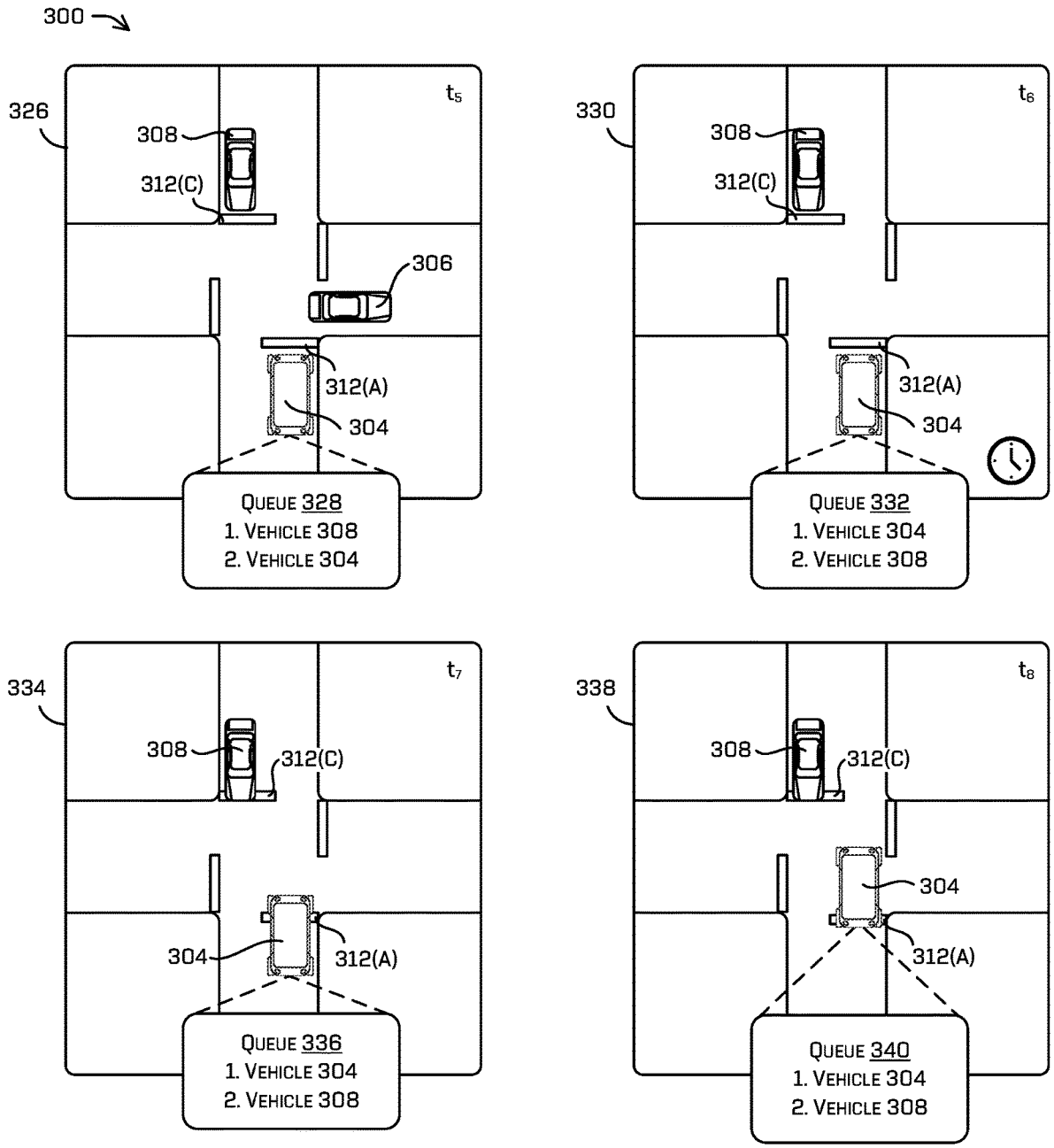

FIGS. 3A and 3B are an illustration 300 of controlling a vehicle at a junction based at least in part on FIFO, a position of another vehicle at the junction, and/or a timeout occurring with another vehicle, in accordance with examples of the disclosure.

An example environment 302 depicts four vehicles approaching a junction at a time A vehicle 304 may be an autonomous vehicle configured to generate and/or update a queue of vehicles at the junction to utilize in traversing the junction. Vehicles 306, 308, and 310 may also be approaching the junction, and may arrive at similar (although not necessarily identical) times as the vehicle 304. In this example, for instance, a distance of each of the vehicles 304-310 relative to corresponding stop lines 312(A), 312(B), 312(C), and 312(D) of the junction at the time $t_1$ may represent an arrival time of each of the vehicles at the respective stop lines. Therefore, the vehicle 310 arrives at the stop line 312(D) first, the vehicle 308 arrives at the stop line 312(C) second, the vehicle 306 arrives at the stop line 312(B) third, and the vehicle 304 arrives at the stop line 312(A) fourth.

An example environment 314 depicts the four vehicles 304-310 arrived at the respective stop lines 312(A)-(D) at a time $t_2$ after the time $t_1$. Upon arriving at the junction, the vehicle 304 may generate a queue 316 that includes the vehicle 304 and the other three vehicles 306-310 at the junction. An order of vehicles in the queue 316 may be based upon arrival times of the vehicles at the junction (e.g., based on a FIFO arrangement). Accordingly, in this example, the vehicle 304 may order the vehicles in the queue 316 with the vehicle 310 first (having arrived first at the junction), followed by the vehicle 308 second, the vehicle 306 third, and the vehicle 304 fourth, according to arrival times at the junction. The vehicle 304 may generate scores for the other vehicles 306-310 at the junction to be used in generating and/or updating the queue 316, such as based on the arrival times of the other vehicles 306-310 at the junction relative to the vehicle 304 as described in relation to FIG. 2.

As the vehicle 304 is not the first vehicle in the queue 316, the vehicle 304 may wait for one or more of the other vehicles to proceed through the junction. In some examples, the vehicle 304 may begin a timer for each of the other vehicles 306-310 which may be used as a timeout component of each of the scores computed for the vehicles 306-310. The timeout component may be combined with the arrival time component to determine a score for each of the other vehicles 306-310. As described above, the vehicle 304 may receive a default score of 0 (or any other score) for placement into the queue 316. Additionally, the arrival time component and/or the timeout component may be combined with a position component for each of the vehicles 306-310 as part of a score for each of the vehicles, although at the time $t_2$ each of the vehicles 306-310 are located at positions near enough to the respective stop lines 312(B)-(D) for the position component of the scores to be negligible.

However, an example environment 318 at a time $t_3$ depicts the vehicle 310 beginning to traverse the junction by changing its position from behind the stop line 312(D) to over the stop line 312(D) and into the junction. Thus, as the vehicle 304 continues to evaluate the scores of the vehicles at the junction, the position component of the vehicle 310 may change corresponding to the change in position of the vehicle 310 relative to the stop line 312(D). Additionally, and in some examples, because the position of the vehicle 310 has changed at time $t_3$, the timeout component may be reset (e.g., to zero), and the score for the vehicle 310 may be updated accordingly. A queue 320 may reflect the changes to the score(s) of the vehicles from the time $t_2$ to the time $t_3$. In this case, the order of the vehicles 304-310 in the queue 320 may be the same as the queue 316, as the vehicle 310 that arrived first at the junction changed its position first to proceed through the junction. The scores for the vehicles 306 and 308 may continue to be updated as the vehicle 310 proceeds through the junction, e.g., by evaluating positions of the vehicles 306 and 308 relative to the stop lines 312(B) and 312(C), and/or by continuing to measure a timeout for the vehicles 306 and 308.

An example environment 322 at a time $t_4$ after the time $t_3$ depicts the vehicle 310 exiting the junction. A queue 324 has been updated from the queue 320 to reflect that the vehicle 310 has exited the junction, and therefore will no longer be evaluated or included in the queue 324. Additionally, at the time $t_4$, the vehicle 306 has begun to proceed through the junction, as evidenced by a change in position of the vehicle 306 relative to the stop line 312(B). Recall that the vehicle 308 arrived at the junction before the vehicle 306, and thus the vehicle 306 is proceeding "out-of-turn" based on FIFO. However, the vehicle 304 may determine the change in position of the vehicle 306, and thus may update the components of the score for the vehicle 306 accordingly, resulting in a change in order of the vehicles 306 and 308 in the queue 324. The vehicle 308 may remain ahead of the vehicle 304 in the queue 324, as the timeout component of the score for the vehicle 308 may not have outweighed the arrival time and position components of the score for the vehicle 308 compared to the default score for the vehicle 304.

Turning to FIG. 3B, an example environment 326 is depicted at a time $t_5$ after the time $t_4$. A queue 328 has been updated from the queue 324 to reflect that the vehicle 306 has exited the junction, and thus will no longer be evaluated or included in the queue 328. This leaves the queue 328 to include the vehicle 308 in a first position of the queue 328 based on the arrival time of the vehicle 308 relative to the vehicle 304, as the position of the vehicle 308 has not changed since the time $t_2$.

An example environment 330 depicts the vehicle 304 and the vehicle 308 at a time $t_6$, some time after the time $t_5$. The position of the vehicle 308 has not changed from the time $t_5$ to the time $t_6$, despite time passing. The vehicle 304 may have been measuring time since the time $t_5$ (e.g., since the vehicle 306 exited the junction), or since the time $t_2$ (e.g., the arrival time of the vehicle 304 at the junction), as part of determining a timeout component of a score for the vehicle 308. At the time $t_6$, the timeout component may outweigh the other components of the score for the vehicle 308, such as the arrival time component and/or the position component. Therefore, the default score assigned to the vehicle 304 may be greater than (or less than) the score for the vehicle 308, thus placing the vehicle 304 ahead of the vehicle 308 in a queue 332 updated from the queue 328. Because the vehicle 304 is first in the queue 332, the vehicle 304 may be controlled to proceed through the junction.

For instance, an example environment 334 depicts the vehicle 304 beginning to proceed through the junction at a time $t_7$ after the time $t_6$, as evidenced by the vehicle 304 crossing the stop line 312(A). The vehicle 304, however, continues to evaluate score(s) of any of the other vehicles at the junction, such as the vehicle 308, resulting in a queue 336 updated based in part on the change in the score for the other vehicles. In this case, the vehicle 308 may have also begun to proceed through the junction, as evidenced by a change in position across the stop line 312(C). Therefore, the vehicle 304 may update the position component of the score for the vehicle 308 based on this change in position from time $t_6$ to time $t_7$. Additionally, in some examples, the vehicle 304 may reset the timeout component of the score for the vehicle 308 in response to the change in position of the vehicle 308, and/or based on the vehicle 304 beginning to proceed through the junction.

In some examples, the position component of the score for the vehicle 308 may be based on the position of the vehicle 308 from the stop line 312(C) relative to the position of the vehicle 304 from the stop line 312(A). As described above in relation to FIG. 2, a default score for the vehicle 304 may compared to the relative positions of the two vehicles 304 and 308 to the respective stop lines 312(A) and 312(C), and a value of the position component for the vehicle 308 may be decreased (or increased) based on the relative positions. For instance, in some cases, it may be safer for a vehicle to continue proceeding through a junction than it would be for the vehicle to stop in a middle of the junction and wait for other vehicles to go around the vehicle. Continuing with this example, even though a position of the vehicle 308 has changed relative to the stop line 312(C) and begun to enter the junction, the score for the vehicle 308 may not be a value large enough to outweigh the default score for the vehicle 304 based on the relative positions of the two vehicles 304 and 308 from the respective stop lines 312(A) and 312(C). In other words, a position of the vehicle 304 relative to a stopping position such as the stop line 312(C) may affect the position component of scores for any of the other vehicles at the junction. However, examples are considered in which the vehicle 304 has not proceeded far enough into the junction, and will stop to yield to the vehicle 308 in response to detecting a change in position of the vehicle 308.

Continuing to evaluate scores of other vehicles when the vehicle 304 begins to proceed through the junction may also incorporate hysteresis, such as to avoid "yield flicker"—in other words, to prevent those scenarios in which yielding order changes based on changing scores. For example, yield flicker occurs when two (or more) vehicles begin to proceed at or near a same time, but then stop to yield to the other vehicle upon detection that the other vehicle has also begun to proceed. Yield flicker may occur repeatedly, and may cause frustration for drivers and passengers within the vehicles. Therefore, a hysteresis value may be applied to one or more of the vehicle scores, which may weight different components of a score (or the score itself) based on a change in a direction of another variable—in this case, position of the other vehicle. For instance, the farther the vehicle 304 is positioned past the stop line 312(A), the score for the vehicle 308 may be down-weighted based on hysteresis, or may need to be a value greater than zero to become first in the queue to traverse the junction. In other words, despite a score changing (e.g., based on time, position, order, etc.), once the vehicle (e.g., vehicle 304) has decided (based on the score) that it should yield for another vehicle (e.g., vehicle 308), it will continue to yield despite having a higher priority (at least for a period of time). Similarly, the inverse is true. Such hysteresis provides additional safety precautions by demonstrating a consistent driving behavior. Further, once the vehicle is traversing the intersection with a given assertiveness (e.g., based on a target speed as described in relation to the fourth graph 208 in FIG. 2), the vehicle may maintain such speed (in some examples, for a period of time), despite changes in other parameters calculated as described above. In such examples, maintaining a speed and/or an assertiveness despite changed scores of other vehicles may provide a safer outcome. For example, other vehicles may react according to the vehicle's behavior passing through the intersection. If the vehicle abruptly stops, goes, continually changes speed, etc., it may cause a confusing scenario for vehicles at the junction, which may result in unintended collisions.

An example environment 338 depicts the vehicle 304 at a time $t_8$ after the time $t_7$, with the vehicle 304 continuing to proceed through the junction. The vehicle 308 has stopped following the position change at time $t_7$, thus yielding to the vehicle 304. The vehicle 304 may still continue to update a queue 340 from the queue 336 as the vehicle 304 proceeds through the junction, and until the vehicle 304 exits the junction or crosses a threshold portion of the junction (e.g., half way through the junction, upon reaching the stop line 312(C), etc.).

Figure 4:
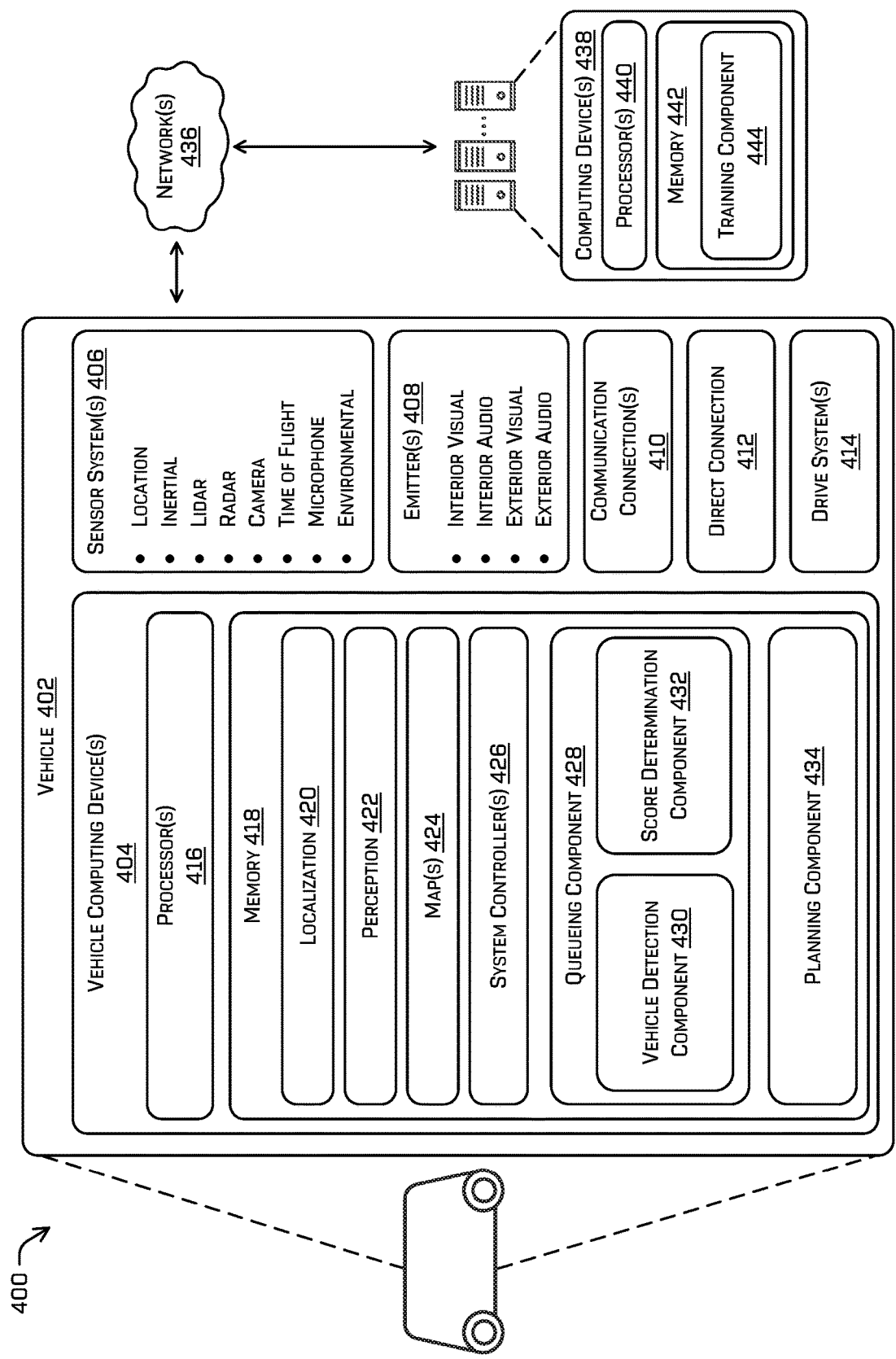
FIG. 4 depicts a block diagram of an example system for implementing the techniques described herein.

FIG. 4 depicts a block diagram of an example system 400 for implementing the techniques described herein.

The vehicle 402 can include vehicle computing device(s) 404, one or more sensor systems 406, one or more emitters 408, one or more communication connections 410, at least one direct connection 412, and one or more drive system(s) 414.

The vehicle computing device(s) 404 can include one or more processors 416 and memory 418 communicatively coupled with the one or more processors 416. In the illustrated example, the vehicle 402 is an autonomous vehicle; however, the vehicle 402 could be any other type of vehicle or robotic platform. In the illustrated example, the memory 418 of the vehicle computing device(s) 404 stores a localization component 420, a perception component 422, one or more maps 424, one or more system controllers 426, a queueing component 428, a vehicle detection component 430, a score determination component 432, and a planning component 434. Though depicted in FIG. 4 as residing in the memory 418 for illustrative purposes, it is contemplated that the localization component 420, the perception component 422, the one or more maps 424, the one or more system controllers 426, the queueing component 428, the vehicle detection component 430, the score determination component 432, and the planning component 434 can additionally, or alternatively, be accessible to the vehicle 402 (e.g., stored on, or otherwise accessible by, memory remote from the vehicle 402).

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, and the like to accurately determine a location of the autonomous vehicle. In some instances, the localization component 420 can provide data to various components of the vehicle 402 to determine an initial position of an autonomous vehicle for generating a trajectory, for determining to retrieve map data, and so forth, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, wheel, pedestrian, cyclist, animal, building, tree, road surface, curb, sidewalk, stoplight, stop sign, stop line, unknown, etc.). In additional or alternative examples, the perception component 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 418 can further include one or more maps 424 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 424 can include at least one map (e.g., images and/or a mesh). In some examples, the vehicle 402 can be controlled based at least in part on the maps 424. That is, the maps 424 can be used in connection with the localization component 420, the perception component 422, the queueing component 428, or the planning component 434 to determine a location of the vehicle 402, identify objects in an environment, and/or generate routes and/or trajectories to navigate within an environment.

In some examples, the one or more maps 424 can be stored on a remote computing device(s) (such as the computing device(s) 438) accessible via network(s) 436. In some examples, multiple maps 424 can be stored based on, for example, a characteristic (e.g., type of entity, time of day, day of week, season of the year, etc.). Storing multiple maps 424 can have similar memory requirements, but increase the speed at which data in a map can be accessed. In some examples, the one or more maps 424 can store sizes or dimensions of objects associated with individual locations in an environment. For example, as the vehicle 402 traverses the environment and as maps representing an area proximate to the vehicle 402 are loaded into memory, one or more sizes or dimensions of objects associated with a location can be loaded into memory as well.

In general, the queueing component 428 may be included as part of the planning component 434, and can generate and update a queue of vehicles at a junction based on data provided by the sensor system(s) 406. In some instances, the queueing component 428 can provide information generated by the vehicle detection component 430 and/or the score determination component 432 to the planning component 434 to determine when and/or how to control the vehicle 402 to traverse an environment, including junctions in the environment. As discussed herein, the vehicle detection component 430 can receive image data, map data, lidar data, and the like to determine information about objects in an environment. Additional information regarding determining information about objects in an environment from sensor data can be found, for example, in U.S. patent application Ser. No. 15/820,245, which is incorporated by reference herein in its entirety. For instance, the vehicle detection component 430 may determine the locations of other vehicles in the environment, locations of the other vehicles relative to landmarks such as junctions or stopping positions, and so forth.

The score determination component 432 can determine scores for vehicles detected by the vehicle detection component 430 to be located at a junction with the vehicle 402. For example, the score determination component 432 may determine an arrival time of other vehicles at the junction relative to the vehicle 402, which may be converted into a component of a score for the respective vehicles at the junction. The score determination component 432 may also determine a position of the vehicle 402 and the other vehicles at the junction relative to a stopping position, such as a stop line (e.g., as may be determined based on detections of the vehicle and map data available to the vehicle 402), which may be converted into a component of the scores for the respective vehicles. Further, the score determination component 432 may determine a timeout corresponding to how long the vehicle 402 has been waiting to proceed through the junction, beginning with the arrival time or based on another event such as another vehicle exiting the junction. Similarly, the timeout may be converted into a component of the scores for the respective vehicles at the junction. The score determination component 432 may combine the components to generate the respective scores for each of the vehicles, and generate a queue based on the scores and a predefined (e.g., default) score for the vehicle 402. Additionally, in some cases, the score determination component 432 may alter the score for the vehicle 402 (and accordingly the queue), such as based on a position of the vehicle 402 in the junction once the vehicle 402 has begun to proceed through the junction. In some examples, the score determination component 432 can provide information regarding the scores of vehicles (including the vehicle 402) and/or a queue generated based on vehicle scores to the planning component 434 to use in controlling the vehicle 402. In at least some examples, such a score determination component 432 may further alter a score based on hysteresis, as described above.

In general, the planning component 434 can determine a path for the vehicle 402 to follow to traverse the environment, e.g., based on a queue of vehicles at a junction as determined by the queueing component 428. For example, the planning component 434 can determine various routes and trajectories and various levels of detail. For example, the planning component 434 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 434 can generate an instruction for guiding the autonomous vehicle along at least a portion of the route from the first location to the second location. In at least one example, the planning component 434 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In some instances, the planning component 434 can generate one or more trajectories for the vehicle 402 based at least in part on a queue of vehicles generated and/or updated at a junction, as discussed herein. In some examples, the planning component 434 can use temporal logic, such as linear temporal logic and/or signal temporal logic, to evaluate one or more trajectories of the vehicle 402.

In at least one example, the vehicle computing device(s) 404 can include one or more system controllers 426, which can be configured to control steering, propulsion, braking, safety, emitters, communication, and other systems of the vehicle 402. These system controller(s) 426 can communicate with and/or control corresponding systems of the drive system(s) 414 and/or other components of the vehicle 402.

As can be understood, the components discussed herein (e.g., the localization component 420, the perception component 422, the one or more maps 424, the one or more system controllers 426, the queueing component 428, the vehicle detection component 430, the score determination component 432, and the planning component 434) are described as divided for illustrative purposes. However, the operations performed by the various components can be combined or performed in any other component. By way of example, functions described in relation to the queueing component 428, the vehicle detection component 430, and/or the score determination component 432 may be performed by the perception component 422 to reduce the amount of data transferred by the system.

In at least one example, the sensor system(s) 406 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the lidar sensors can include individual lidar sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device(s) 404. Additionally or alternatively, the sensor system(s) 406 can send sensor data, via the one or more networks 436, to the one or more computing device(s) at a particular frequency, after a lapse of a predetermined period of time, in near real-time, etc.

The vehicle 402 can also include one or more emitters 408 for emitting light and/or sound, as described above. The emitters 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communication connection(s) 410 also enable the vehicle 402 to communicate with a remote teleoperations computing device or other remote services.

The communication connection(s) 410 can include physical and/or logical interfaces for connecting the vehicle computing device(s) 404 to another computing device or a network, such as network(s) 436. For example, the communications connection(s) 410 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In at least one example, the localization component 420, the perception component 422, the one or more maps 424, the one or more system controllers 426, the queueing component 428, the vehicle detection component 430, the score determination component 432, and the planning component 434 can process sensor data, as described above, and can send their respective outputs, over the one or more network(s) 436, to one or more computing device(s) 438. In at least one example, the localization component 420, the perception component 422, the one or more maps 424, the one or more system controllers 426, the queueing component 428, the vehicle detection component 430, the score determination component 432, and the planning component 434 can send their respective outputs to the one or more computing device(s) 438 at a particular frequency, after a lapse of a predetermined period of time, in near real-time, etc.

In some examples, the vehicle 402 can send sensor data to one or more computing device(s) 438 via the network(s) 436. In some examples, the vehicle 402 can send raw sensor data to the computing device(s) 438. In other examples, the vehicle 402 can send processed sensor data and/or representations of sensor data to the computing device(s) 438. In some examples, the vehicle 402 can send sensor data to the computing device(s) 438 at a particular frequency, after a lapse of a predetermined period of time, in near real-time, etc. In some cases, the vehicle 402 can send sensor data (raw or processed) to the computing device(s) 438 as one or more log files.

The computing device(s) 438 can include processor(s) 440 and a memory 442 storing a training component 444.

In some instances, the training component 444 can include functionality to train one or more models to detect vehicles, detect locations of vehicles at a junction (e.g., relative to a stopping position), and the like. In some instances, the training component 444 can communicate information generated by the one or more models to the vehicle computing device(s) 404 to revise how to control the vehicle 402 in response to different situations.

For instance, aspects of some or all of the components discussed herein can include any models, algorithms, and/or machine learning algorithms. For example, in some instances, the components in the memory 442 (and the memory 418, discussed above) can be implemented as a neural network. In some examples, the training component 444 can utilize a neural network to generate and/or execute one or more models to improve various aspects of object trajectory estimation for use in trajectory planning of the vehicle 402.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 416 of the vehicle 402 and the processor(s) 440 of the computing device(s) 438 can be any suitable processor capable of executing instructions to process data and perform operations as described herein. By way of example and not limitation, the processor(s) 416 and 440 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 442 are examples of non-transitory computer-readable media. The memory 418 and 442 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 438 and/or components of the computing device(s) 438 can be associated with the vehicle 402. That is, the vehicle 402 can perform one or more of the functions associated with the computing device(s) 438, and vice versa. Further, aspects of the queueing component 428 and/or the planning component 434 can be performed on any of the devices discussed herein.

Figure 5:
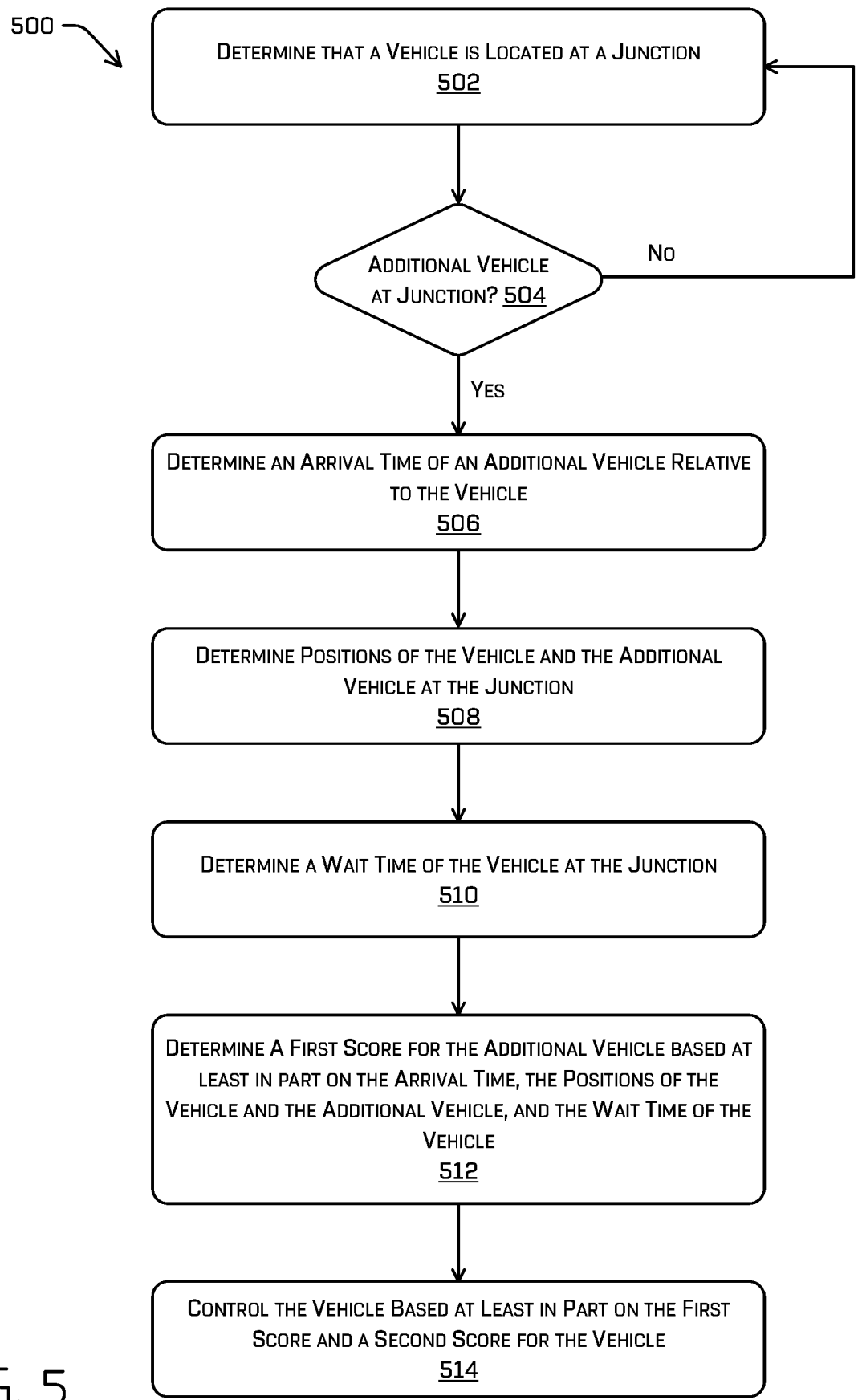
FIG. 5 depicts an example process for controlling a vehicle by determining a queue of vehicles at a junction based at least in part on an arrival time of another vehicle relative to the vehicle, positions of the vehicle and the other vehicle in the junction, and a wait time of the vehicle, in accordance with examples of the disclosure.

FIG. 5 depicts an example process for controlling a vehicle by determining a queue of vehicles at a junction based at least in part on an arrival time of another vehicle relative to the vehicle, positions of the vehicle and the other vehicle in the junction, and a wait time of the vehicle, in accordance with examples of the disclosure. For example, some or all of the process 500 can be performed by one or more components in FIG. 4, as described herein. For example, some or all of the process 500 can be performed by the vehicle computing device(s) 404, the computing device(s) 438, or any other computing device or combination of computing devices. Further, any of the operations described in the example process 500 may be executed in parallel, in a different order than depicted in the process 500, omitted, combined with other processes, and the like.

At operation 502, the process can include determining that a vehicle is located at a junction. For example, the vehicle may collect sensor data captured by a sensor on the vehicle as it traverses an environment (e.g., from any one or more of a camera, lidar, radar, time of flight, etc.). The vehicle may determine, from the sensor data, that the vehicle has arrived at a junction. Alternatively or in addition, the vehicle may utilize map data and/or other localization techniques to determine that the vehicle is located at the junction.

At operation 504, the process can include determining whether an additional vehicle is at the junction. The additional vehicle may be determined from the sensor data of the vehicle, as well. If no vehicle is located at the junction, the vehicle may traverse the junction according to any pertinent traffic laws, and continue along a route to another junction, if present. Thus, the process 500 may return to operation 502 if no other vehicle is detected, and the vehicle approaches another junction in the environment.

If another vehicle is detected at the junction, the process 500 may proceed to operation 506, where an arrival time of an additional vehicle is determined relative to the vehicle. In some examples, a component of a score for the additional vehicle may be determined based on the arrival time of the additional vehicle relative to the vehicle. For instance, a value of the component may be based at least in part on a linear and/or piecewise function corresponding to the arrival time of the additional vehicle relative to the vehicle at the junction.

At operation 508, the process can include determining positions of the vehicle and the additional vehicle at the junction. Continuing with the above example, a component of the score for the additional vehicle may be determined based on a position of the additional vehicle relative to a stopping position at the junction, such as a stop line (which may be determined based on map data made available to the vehicle). In some examples, the vehicle may be assigned a default score for comparing to other vehicles, including the additional vehicle, to utilize for queueing vehicles at the junction. If the position of the vehicle is at or behind a stopping position, the vehicle may be assigned the default score to be used for queueing. However, in some cases, the vehicle may have crossed the stopping position and proceeded at least partially into the junction. In these instances, the score for the vehicle may be updated to reflect this position, e.g., to reduce the likelihood that the vehicle will yield to the additional vehicle for safety reasons.

At operation 510, the process can include determining a wait time of the vehicle at the junction. For instance, the wait time may be based on a time elapsed since the arrival time of the vehicle at the junction, and/or based on a time elapsed since another vehicle performed an action such as entering or exiting the junction. Similar to the above, a component of the score for the additional vehicle may be determined based on the wait time of the vehicle, such that the vehicle may proceed through the junction if the additional vehicle has been stationary for a threshold amount of time (e.g., 3 seconds, 5 seconds, 8 seconds, etc.). Although shown in series in the process 500, the operations 508 and 510 may be performed substantially simultaneously (e.g., in parallel), such that the wait time is being determined while the positions of the vehicle and the additional vehicle are also being determined.

At operation 512, the process can include determining a first score for the additional vehicle based at least in part on the arrival time, the positions of the vehicle and the additional vehicle, and the wait time of the vehicle. For instance, the first score for the additional vehicle may be determined by a weighted combination of the components of the score for the additional vehicle.

At operation 514, the process can include controlling the vehicle based at least in part on the first score and a second score for the vehicle. In some examples, the second score for the vehicle may be a default score, such as set to a value of 0. If the score of the vehicle is higher (or lower) than the score of the additional vehicle, the vehicle may be controlled to begin to proceed through the junction. The vehicle may continue to evaluate the position of the additional vehicle as the vehicle traverses the junction and update the score of the additional vehicle accordingly, along with continuing to compare the score of the vehicle to that of the additional vehicle to determine whether the vehicle should yield or continue proceeding through the junction. However, if the score of the vehicle is lower (or higher) than the score of the additional vehicle, the vehicle may yield to the additional vehicle for a time until a minimum amount of time has passed, and/or a component of the score for the additional vehicle corresponding to wait time changes the order of the vehicles in the queue, allowing the vehicle to proceed ahead of the additional vehicle.

Example Clauses

A: A system comprising: one or more processors; and one or more computer-readable media storing instructions executable by the one or more processors, wherein the instructions, when executed, cause the system to perform operations comprising: determining that an autonomous vehicle is positioned at a junction; determining a first arrival time of a vehicle at the junction relative to a second arrival time of the autonomous vehicle at the junction; determining a first position of the autonomous vehicle relative to a first stopping position of the junction; determining a second position of the autonomous vehicle relative to a second stopping position of the junction; determining a wait time of the autonomous vehicle at the junction, the wait time based at least in part on the first arrival time; determining a first score for the vehicle based at least in part on the first arrival time, the first position, the second position, and the wait time; comparing the first score to a second score for the autonomous vehicle; and controlling the autonomous vehicle to traverse the junction based at least in part on the comparison of the first score to the second score.

B: The system of paragraph A, wherein the first score is determined at a first time, the operations further comprising: updating, as an updated first score, the first score at a second time after the first time; comparing the updated first score to the second score; and controlling the autonomous vehicle to traverse the junction based at least in part on the updated first score and the second score.

C: The system of paragraph B, wherein updating the first score is based at least in part on a change in the first position of the vehicle, and wherein controlling the autonomous vehicle further comprises controlling a velocity of the autonomous vehicle based on the first score.

D: The system of paragraph A, the operations further comprising: determining a speed for the autonomous vehicle based at least in part on the first score, wherein controlling the autonomous vehicle to traverse the junction based at least in part on the first score further comprises controlling the autonomous vehicle to move based at least in part on the speed.

E: A method comprising: determining that a first vehicle is positioned at a junction, the first vehicle associated with a first arrival time at the junction; determining a first score for a second vehicle at the junction, the first score based at least in part on: a second arrival time of the second vehicle at the junction relative to the first arrival time of the first vehicle at the junction; a position of the second vehicle relative to a stopping position at the junction; and a wait time of the first vehicle at the junction; and controlling the first vehicle based at least in part on the first score and a second score.

F: The method of paragraph E, further comprising: determining a third score for a third vehicle at the junction, the third score based at least in part on: a third arrival time of the third vehicle at the junction relative to the first arrival time and the second arrival time; a position of the third vehicle relative to a second stopping position at the junction; and the wait time of the first vehicle, wherein controlling the first vehicle is further based on the third score.

G: The method of paragraph F, wherein controlling the first vehicle comprises controlling the first vehicle to traverse at least a portion of the junction based at least in part on the second score being greater than the first score and the third score.

H: The method of paragraph E, wherein the second arrival time is a component of the first score, and a value of the component is based at least in part on a linear function.

I: The method of paragraph E, wherein first score is based at least in part on a linear function of the distance of the second vehicle from the stopping position.

J: The method of paragraph E, wherein the first score comprises a linear function of an elapsed time since the first arrival time.

K: The method of paragraph E, wherein the stopping position is associated with a stop line at the junction or a yield line at the junction.

L: The method of paragraph E, wherein the first score is determined at a first time, the method further comprising: updating, as an updated first score, the first score at a second time after the first time; comparing the updated first score to the second score, wherein controlling the first vehicle comprises controlling the first vehicle to traverse the junction based at least in part on the updated first score and the second score.

M: The method of paragraph L, wherein updating the first score is based at least in part on a change in a position of the first vehicle at the junction or a change in the position of the second vehicle at the junction, and wherein controlling the first vehicle further comprises controlling a velocity of the first vehicle based on the updated first score.

N: One or more computer-readable media storing instructions that when executed by one or more processors perform operations comprising: determining that a first vehicle is positioned at a junction, the first vehicle associated with a first arrival time at the junction; determining a first score for a second vehicle at the junction, the first score based at least in part on: a second arrival time of the second vehicle at the junction relative to the first arrival time of the first vehicle at the junction; and a position of the second vehicle relative to a stopping position at the junction; comparing, as a comparison, the first score to a second score for the first vehicle; and controlling the first vehicle based at least in part on the comparison.

O: The one or more computer-readable media of paragraph N, wherein controlling the first vehicle comprises controlling the first vehicle to yield to the second vehicle for a minimum amount of time.

P: The one or more computer-readable media of paragraph N, wherein the first score is determined at a first time, the operations further comprising: updating, as an updated first score, the first score at a second time after the first time, wherein controlling the first vehicle comprises controlling the first vehicle based at least in part on the updated first score and the second score.

Q: The one or more computer-readable media of paragraph P, wherein updating the first score is based at least in part on a change of the position of the second vehicle relative to the stopping position at the junction from the first time to the second time.

R: The one or more computer-readable media of paragraph Q, the operations further comprising generating a queue that includes at least the first vehicle and the second vehicle, an order of the first vehicle and the second vehicle in the queue being based at least in part on the first score and the second score, wherein a rank of the first vehicle in the queue corresponds to an instruction to control the first vehicle to traverse the junction, and the updated first score corresponds to an instruction to control the first vehicle to yield to the second vehicle.

S: The one or more computer-readable media of paragraph N, the operations further comprising continuously determining the first score and comparing the first score to the second score at least until the first vehicle has traversed a threshold portion of the junction.

T: The one or more computer-readable media of paragraph N, the operations further comprising: determining a difference between the first score and the second score; and determining a target speed for the first vehicle to traverse the junction based at least in part on the difference between the first score and the second score, wherein controlling the first vehicle is further based on the target speed.

While the example clauses described above are described with respect to one particular implementation, it should be understood that, in the context of this document, the content of the example clauses can also be implemented via a method, device, system, a computer-readable medium, and/or another implementation. Additionally any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
determining that a first vehicle is located at a first position relative to a first stopping position of a junction;
determining a first score associated with the first vehicle based at least in part on the first position;
determining that a second vehicle is located at a second position relative to a second stopping position of the junction;
determining a second score associated with the second vehicle based at least in part on the second position;
determining, based at least in part on the first score and the second score, a rank of the first vehicle in a queue; and
controlling the first vehicle to traverse the junction based at least in part on the rank.

2. The system of claim 1, wherein controlling the first vehicle comprises one of:
controlling the first vehicle to traverse at least a portion of the junction; or
controlling the first vehicle to remain at the first position.

3. The system of claim 2, wherein controlling the first vehicle to traverse at least the portion of the junction further comprises controlling a velocity of the first vehicle based at least in part on the portion traversed.

4. The system of claim 1, wherein the rank is determined at a first time, the operations further comprising:

determining a third position of the first vehicle relative to the second stopping position of the junction at a second time after the first time; and updating the rank based at least in part on the third position.

5. A method comprising:

determining that a first vehicle is located at a first position relative to a first stopping position of a junction;

determining a first score associated with the first vehicle based at least in part on the first position;

determining that a second vehicle is located at a second position relative to a second stopping position of the junction;

determining a second score associated with the second vehicle based at least in part on the second position;

determining, based at least in part on the first score and the second score, a rank of the first vehicle in a queue; and controlling the first vehicle based at least in part on the rank of the first vehicle in the queue.

6. The method of claim 5, further comprising:

determining a third position of a third vehicle relative to a third stopping position at the junction; and determining a rank of the third vehicle in the queue, based at least in part on the third position, wherein controlling the first vehicle is further based at least in part on the rank of the third vehicle.

7. The method of claim 5, further comprising:

determining an amount of time the second vehicle has remained static; and modifying, as an updated rank, the rank based at least in part on the amount of time, wherein controlling the first vehicle is further based at least in part on the updated rank.

8. The method of claim 5, wherein controlling the first vehicle comprises controlling the first vehicle to proceed at least partially into the junction based at least in part on the rank of the first vehicle being higher than a rank of the second vehicle.

9. The method of claim 5, wherein controlling the first vehicle comprises controlling the first vehicle to yield to the second vehicle for an amount of time based at least in part on the rank of the first vehicle being lower than a rank of the second vehicle.

10. The method of claim 9, wherein the rank of the first vehicle in the queue is updated after the amount of time has elapsed.

11. The method of claim 5, wherein the rank of the first vehicle in the queue is determined at a first time, the method further comprising:

updating the rank of the first vehicle in the queue at a second time after the first time to obtain an updated rank, wherein controlling the first vehicle comprises controlling the first vehicle to traverse the junction based at least in part on the updated rank.

12. The method of claim 5, wherein the first stopping position and the second stopping position are associated with a stop line at the junction or a yield line at the junction.

13. The method of claim 5, wherein the queue is updated based at least in part on a change in the first position or a change in the second position.

14. One or more computer-readable media storing instructions that when executed by one or more processors perform operations comprising:

determining that a first vehicle is positioned at a junction, the first vehicle associated with a first position relative to a first stopping position of the junction;

determining a first score associated with the first vehicle based at least in part on the first position;

determining that a second vehicle is positioned at the junction, the second vehicle associated with a second position relative to a second stopping position of the junction;

determining a second score associated with the second vehicle based at least in part on the second position;

determining, based at least in part on the first score and the second score, a rank of the first vehicle in a queue; and controlling the first vehicle based at least in part on a rank of the first vehicle in the queue.

15. The one or more computer-readable media of claim 14, wherein controlling the first vehicle comprises one of:

controlling the first vehicle to traverse the junction for a first amount of time; or controlling the first vehicle to remain at the second position for a second amount of time.

16. The one or more computer-readable media of claim 14, wherein the first stopping position and the second stopping position are determined based at least in part on map data associated with the junction.

17. The one or more computer-readable media of claim 16, the operations further comprising:

determining one or more candidate trajectories of the second vehicle, based at least in part on the second position.

18. The one or more computer-readable media of claim 17, the operations further comprising:

updating the queue to include a third vehicle based on an arrival of the third vehicle at a third stopping position of the junction.

19. The one or more computer-readable media of claim 14, the operations further comprising continuously updating the queue until the first vehicle has traversed a threshold portion of the junction.

20. The one or more computer-readable media of claim 14, wherein controlling the first vehicle further comprises controlling a velocity of the first vehicle.

* * * * *